P. W. FORSBERG.
ELECTRIC BRAKING.
APPLICATION FILED FEB. 21, 1920.

1,421,931.

Patented July 4, 1922.
4 SHEETS—SHEET 3.

Inventor:
Peter W. Forsberg,
by
His Attorney.

Inventor:
Peter W. Forsberg
by *Albert G. Davis*
His Attorney

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

ELECTRIC BRAKING.

1,421,931.  Specification of Letters Patent.  Patented July 4, 1922.

Application filed February 21, 1920. Serial No. 360,288.

*To all whom it may concern:*

Be it known that I, PETER W. FORSBERG, a citizen of the United States, residing at Schenectady, county of Schenectady, State of New York, have invented certain new and useful Improvements in Electric Braking, of which the following is a specification.

My invention relates to systems of control for dynamo-electric machines and, in particular, it relates to systems wherein the dynamo-electric machines either operate as motors to drive a load or are driven by the load and operate as generators to retard the load.

Although not limited to such use, my invention has a particular usefulness in the control of the electric driving motors of an electric vehicle such, for instance, as an electric locomotive or the like.

My invention provides improved means whereby the motors are caused to either operate as motors to drive the electric vehicle or to operate as generators to retard the vehicle. Improved means are provided whereby the braking effect is very nicely controlled in a simple and effective manner, the electric braking effect is either increased or decreased at will, and when the system is used to brake the vehicle electrically by delivering energy to the source of supply, variations in the voltage of the source of supply are automatically compensated for.

In certain of its aspects my invention provides improved means whereby a portion of the driving motors is used to supply the field excitation for the remainder of the motors so as to produce an electric braking effect to retard the vehicle, although it is also applicable to systems wherein a separate dynamo-electric machine is used as an exciter for the fields of the main dynamo-electric machines.

One of the objects of my invention is to provide an improved arrangement in which the current through the exciter portion of the dynamo-electric machines is merely the excitation current for the fields of the machines, the arrangement being such, however, that the exciter portion may be substantially fully loaded, and the braking current very accurately controlled.

One of the objects of my invention is to provide an arrangement in which during braking the connections are such that inherent protection is provided against excessive fluctuations in the braking current. In systems of regenerative braking heretofore proposed, various complications have been resorted to in order to take care of fluctuations in the voltage of the supply circuit, such as are ordinarily experienced in electric traction systems, and one of the objects of my invention is to provide a simple and effective arrangement which has an inherent compensating effect to take care of these fluctuations.

Another object of my invention is to provide a simple and effective arrangement in which the compensating action against changes in the potential of the source increases as the excitation of the dynamo-electric machines is decreased and as the speed of the machines increases. This is a very important feature, since dynamo-electric machines operating as motors part of the time and as generators part of the time are very apt to arc over at their commutators when operating as generators, and the tendency to arc over is always greater at weak fields and high speeds.

Another object of my invention is to provide an improved arrangement in which a portion of the dynamo-electric machines is operated as a series exciter for the remainder of the machines and the braking effect is controlled by varying a resistance included in the excitation circuit.

Another object of my invention is to provide an arrangement for braking in which the field winding of the exciter portion of the machines is shunted by a non-inductive circuit with a path provided for the braking current through a portion of the circuit, so that variations in the excitation of the exciter are not affected by the inductance of the remainder of the field windings.

Another object of my invention is to provide an arrangement in which substantially the same apparatus which is used to control the acceleration during motoring operation is also used to control the braking during generator operation of the dynamo-electric machines.

Another object of my invention is to provide an arrangement in which a resistor is provided for varying the speeds of the machines when they are operating as motors and also for varying the braking current when the machines are operating as generators, the arrangement being such that the resistance is varied in the same increments during motoring as during braking operation.

Another object of my invention is to provide an arrangement in which a single controller is used for both the motoring and braking operations, the controller being moved through the same operative positions during braking as during motoring.

For a better understanding of my invention, reference is had to the accompanying drawings in which.

Figure 2:
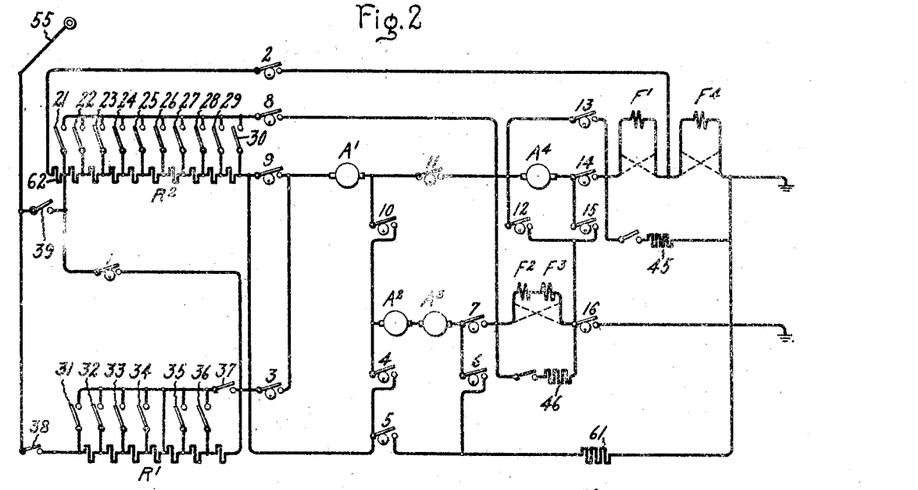
Fig. 2 is a simplified diagram of the main circuit connections of Fig. 1.
Figure 3:
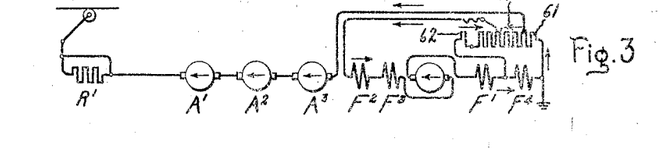
Fig. 3 is a schematic diagram showing in very simplified form the connections of the dynamo-electric machines when they are operating as electric braking generators.
Figure 4:
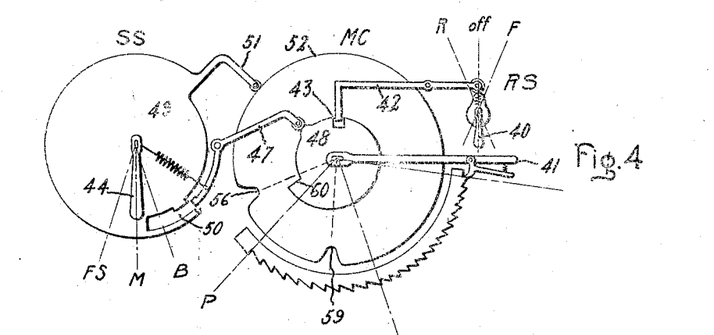
Fig. 4 is a simplified drawing of a detail of Fig. 1 showing the interlocking between the main controller handle, the handle for effecting motoring or braking connections and the handle for effecting reversal of the direction of operation of the vehicle or other load driven by the dynamo-electric machines.

Referring to Figs. 1, 2, 3 and 4, the dynamo-electric machines having armatures $A^1$, $A^2$, $A^3$, $A^4$ and series fields $F^1$, $F^2$, $F^3$, $F^4$ respectively, are adapted to be controlled for series or parallel operation, motoring, or for electric braking by means of the master controller MC which has a plurality of operative positions. Associated with, and forming a part of the master controller, is a selector switch SS which is adapted to cooperate with the master controller to energize switch mechanism so as to establish motoring connections or braking connections, or motoring connections with resistors shunted around the series field windings. Cooperating with the master controller is a master reversing switch RS. The master controller, the selector switch and the master reversing switch are interlocked as shown in Fig. 4 in such a way that the reversing switch cannot be thrown unless the operating handle of the master controller is in the off position; or the selector switch cannot be thrown to establish braking or motoring connections unless the handle of the master controller is in the off position. The arrangement is such that field shunting connections can be established by means of the selector switch only when the handle of the master controller is at the full series motoring position or at the full parallel motoring position. It will be understood that the field shunting connections are provided for obtaining additional speed points in either series or parallel motoring operations. A plurality of cam switches numbered 1 to 16 are provided for effecting changes in the main circuit connections so as to connect the machines in series relation, parallel relation with two motors in series in each of the parallel circuits, or braking connections using the dynamo-electric machine having armature $A^4$ and field $F^4$ as a series exciter for the fields of the remainder of the machines. The cams for operating these switches will ordinarily be mounted on a rotatable drum, but for the sake of simplicity in the drawings the cams are shown developed on a plain surface. The drum with the operating cams is biased to the position at which the motors are connected in series relation by means of the springs 17 and 18, and the winding 19 is provided for rotating the drum so that the upper row of cams will make engagement with their respective contacts so as to establish parallel motoring connections. The winding 20 is provided for rotating the cam drum so as to cause the lower row of cams to make engagement with their respective contacts so as to establish connections for braking operation. A resistor $R^1$ and a resistor $R^2$ are provided for limiting the current taken by the motors during motoring operation, and the resistor $R^2$ is also used for varying the value of the braking current during braking operation. A plurality of electromagnetic switches or contactors numbered 21 to 30 inclusive are provided for short circuiting the resistor $R^2$ in a number of successive increments of resistance. A plurality of contactors 31 to 37 inclusive are provided for short circuiting the resistor $R^1$ in a plurality of increments. The line contactor 38 is provided for establishing motoring connections for series motoring and braking operations, and the line contactor 39 is provided for establishing parallel motoring operations. The reversing switch RS' is adapted to be controlled by the master reversing switch RS by means of the operating electromagnets.

Figure 1:
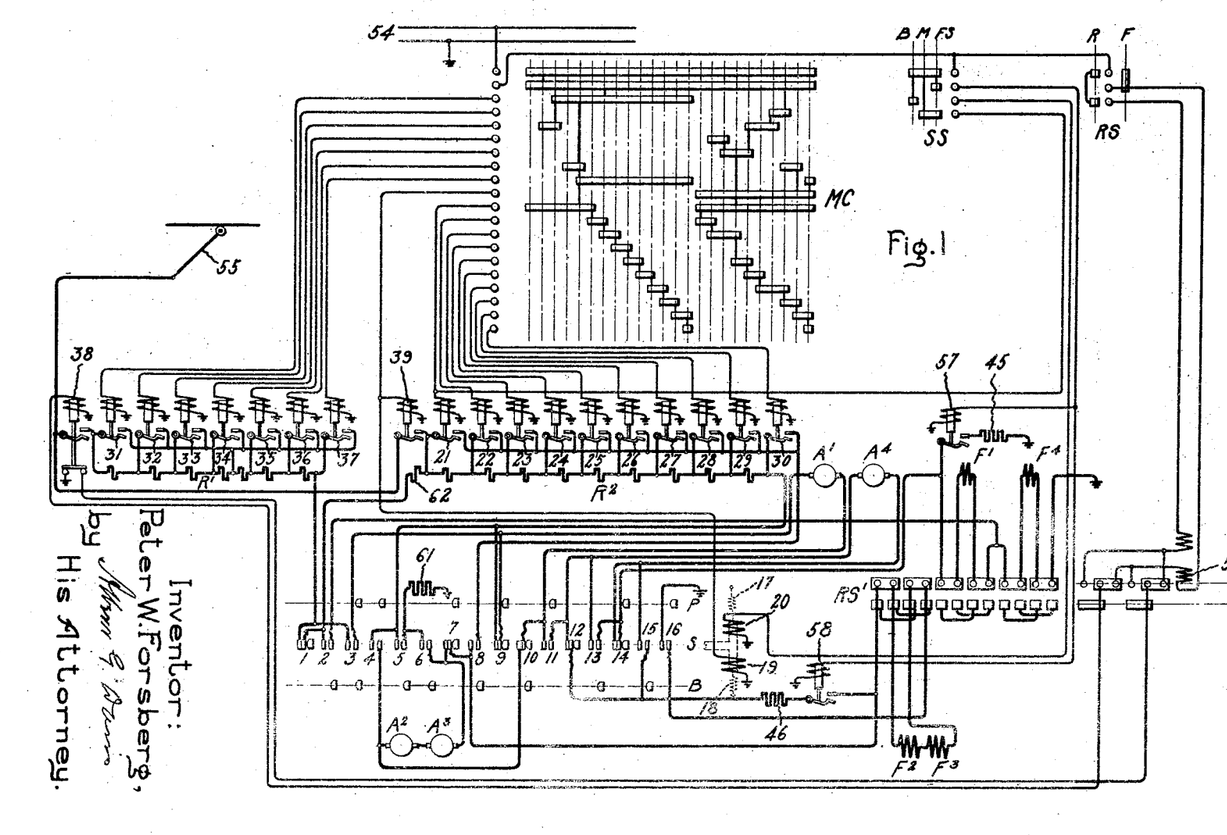
Fig. 1 is a simplified diagram of a system of control for a plurality of dynamo-electric machines, embodying my invention.

It is believed that a further and more particular description of the arrangement will be better understood from a description of the operation of the same. Since Fig. 2 shows the main motor circuit connections, it is believed that an understanding of the invention will be readily had by reference to this figure in tracing out the main motor connections, and by reference to Fig. 1 when tracing out the circuit for the operating windings of the various electromagnetic switches. Assume that the parts are in the positions shown in Figs. 1 and 2, and that it is desired to cause the machines to operate as motors to drive the load. Assume also that it is desired that the operation shall be in the forward direction.

Reference is, however, first had to Fig. 4, which shows in very simplified and diagrammatic form the interlocking arrangement between the various parts of the master controller. In this figure, the top only of the master controller is shown. The handle 40 of the master reversing switch is shown in the off position, and since the handle 41 of the master controller MC is in the off position, the pivoted interlocking detent 42 will be released from engagement in a slot 43 of a cam secured to the operating handle 41 of the master controller when the handle 40 of the reversing switch is thrown to the left to the dotted line position indicated by the letter F. The end of the pivoted detent 42 will then be moved out of the slot 43 and the handle 41 of the master controller can be rotated clockwise. The handle 44 of the selector switch is shown in the position for motoring operation, although in Fig. 1 the selector switch is shown in the off position. When this handle is rotated to the right to the dotted line position indicated by the letter B, connections are established for braking, and when the handle is thrown to the left to the dotted line indicated by the letters FS, connections are established for shunting the fields $F^1$ and $F^4$ by the resistor 45 and the fields $F^2$ and $F^3$ by means of the resistor 46, both of which are shown in Figs. 1 and 2. A pivoted detent 47 having a roller which cooperates with a cam 48 secured to the handle 41 of the master controller is provided for preventing the throwing of the handle 44 of the selector switch from one operative position to the other, unless the handle 41 of the master controller is in certain positions. The end of the pivoted detent 47 cooperates with a disk 49 secured to the handle 44 of the selector switch. The end of the pivoted detent 47 is adapted to enter the slot 50 in the cam disk 49 when the handle 44 of the selector switch is turned to the right of the braking position. A radial arm 51 of the cam disk 49 cooperates with a cam disk 52 secured to the controller handle 41. The arrangement is such that the handle 44 cannot be thrown to the left into the field shunting position unless the handle 41 of the master controller is in either the full series or the full parallel motoring position.

Assume that the handle 44 of the selector switch of Fig. 1 is in the position shown in Fig. 4, that is, the second operative position, and the reversing switch RS is thrown to the left for forward operation. If the handle 41 of the master controller MC is now turned to the left to the first operative position, the coil 53 of the electromagnet reverser and the winding of the contractor 38 will be energized in series across the supply circuit 54. Current for the supply circuit 54 will be supplied at a suitable potential for controlling the various electromagnet switches of the arrangement. It is shown as a separate source from the trolley, although it need not necessarily be so. The contactor 21 will also be energized to close, the circuit for the winding being through the selector switch and through a segment of the controller. The drum having cams for operating the main circuit switches 1 to 16 inclusive will be in its biased position, that shown in Fig. 1, since neither of the windings 19 or 20 is energized. The closing of the electromagnetic line switch 38 connects the motors in series across the supply circuit, the circuit being from the trolley 55, through contacts of contactor 38, resistor $R^1$, cam switch 1, resistor $R^2$, cam switch 9, armature $A^1$, cam switch 10, armatures $A^2$ and $A^3$, cam switch 7, series fields $F^2$ and $F^3$, cam switch 12, armature $A^4$, cam switch 14 and fields $F^1$ and $F^4$ to ground, the other side of the supply circuit. Turning the master controller to the second operative position closes contactor 33, thereby short circuiting two sections of the starting resistor $R^1$. At the third operative position contactor 31 is closed, thereby short circuiting two more sections of the starting resistor $R^1$. In the fourth operative position the contactor 36 is energized to close so as to short circuit two more sections of the resistor $R^1$, and in the fifth operative position the contactor 37 is energized to close and short circuit all of the starting resistor $R^1$. In the sixth operative position the contactor 22 is energized to close and short circuit one section of the resistor $R^2$. It will be remembered that the contactor 21 is maintained closed by reason of the fact that its winding is energized through a contact of the selector switch. The contactors 23 to 30 inclusive are energized to close in succession when the controller is moved through the operative positions 8 to 14 inclusive so that at the final position the motors are connected directly across the source of supply with all of the starting resistance ($R^1$ and $R^2$) short circuited. The handle 41 of the master controller will now be at the dotted line position indicated by the letter S and the radial arm 51 on the cam disk 49 can enter the slot 56 in the cam plate 52. The handle 44 of the selector switch can then be moved to the left so as to energize the contactor 57 to include the resistor 45 in a shunt around the series fields $F^1$ and $F^4$, and the contactor 58 to close and include the resistor 46 in a shunt around the fields $F^2$ and $F^3$.

At the fifteenth position, the transfer from series motoring to series parallel motoring is effected. In this position of the master controller, the resistance contactors 37 and 31 are deenergized and the resistance contactor 30 for short circuiting the resistor $R^2$ is also deenergized, thereby including the resistors $R^1$ and $R^2$ in the motor circuits. The winding 19 for operating the cam drum is energized so as to open the cam switches 1, 7, 9, 10, 12 and 14 and close the cam switches 3, 4, 7, 9, 11, 14 and 16 to establish connections in which the armatures $A^2$ and $A^3$ and their series fields $F^2$ and $F^3$ are connected in series with the resistor $R^2$, and the armatures $A^1$ and $A^4$ and their corresponding series fields $F^1$ and $F^4$ are connected in series with the resistor $R^1$. The transfer switch is shown with the cams engaging the contactors in only the final positions, but the sequence in which these contacts open and close may be in accordance with any approved method of transfer from series to parallel. The line contactor 39 is also closed in this position, and the resistance contactors 21 and 22 are energized to close and short circuit two sections of the resistor $R^2$. The one parallel circuit includes the line contactor 38, the resistor $R^1$, cam switch 3, armature $A^1$, cam switch 11, armature $A^4$, cam switch 14 and fields $F^1$ and $F^4$ to ground, the other side of the supply circuit. The other circuit, in parallel with that just traced, includes the line contactor 39, contactor 21, contactor 23, the remainder of resistor $R^2$, cam switch 4, armatures $A^2$ and $A^3$, cam switch 7, series fields $F^2$ and $F^3$ and cam switch 16 to ground. The two resistors $R^1$ and $R^2$ are connected in multiple by the cam switch 9 being closed, so that each motor circuit in parallel will operate on the same voltage regardless of variations of resistance between $R^1$ and $R^2$. At the sixteenth operative position, the contactor 34 is energized to close and short circuit a portion of the resistor $R^1$, and the contactor 23 is energized to close and short circuit a portion of the resistor $R^2$. At the seventeeth position, the contactor 35 is energized to close and short circuit a portion of the resistor $R^1$. At the eighteenth position, the contactor 25 is energized to close and short circuit a portion of the resistor $R^2$. The short circuiting of a portion of each of the resistors $R^1$ and $R^2$ proceeds throughout the successive steps of the master controller until the controller handle 41 of the master controller is in the final or twenty-fourth operative position indicated by the dotted line designated by the letter P. In this final position the motors will be connected two in series, in multiple with the two remaining motors in series, directly across the supply circuit. At this position of the handle 41 of the master controller, the detent 51 is permitted to enter the slot 59 in the cam disk 52 of the master controller, so that the handle 44 of the selector switch can be thrown to the left so as to energize the contactor 57 to include the resistor 45 in a shunt circuit to the fields $F^1$ and $F^4$, and the contactor 58 to close and include the resistor 46 in a shunt circuit to the fields $F^2$ and $F^3$. An additional increased running position is thereby provided.

If it is now desired to cease motoring and to brake the load by delivering energy to the source of supply, the master controller will first be returned to the off position so that the handle 44 of the selector switch may be thrown to the right to establish braking connections. With the selector switch thrown to the right, the operating winding 20 of the cam drum is energized to move the drum so that the lower set of cam segments close the cam switches 2, 3, 5, 6, 8, 10, 13 and 15, and open those previously closed. The one end of the pivoted detent 47 associated with the selector switch is thus caused to enter the slot 50 in the cam plate 49. This will hold the detent 47 in such position that the handle 41 of the master controller cannot be moved beyond the full series position. When the full series position is reached, the roller on the other end of the detent 47 abuts against the surface 60 on the cam disk 48 and prevents the handle 41 of the master switch being rotated further in the clockwise direction. When the master controller is moved to its first operative position, the roller of the detent 47 drops off the hump on cam 48 allowing the other end to drop into and engage a notch in slot 50. This locks the selective handle 44 so that it cannot be thrown back to M except with handle 41 in the off position. Line contactor 38 is also closed and the armatures $A^1$, $A^2$ and $A^3$ are included in series with the resistor $R^1$ and the compensating resistor 61 across the supply circuit, the circuit being through the contactor 38, the resistor $R^1$, cam switch 3, armature $A^1$, cam switch 10, armatures $A^2$ and $A^3$, cam switch 6 and resistor 61 to ground. The field $F^4$ is shunted by the resistor $R^2$, the resistor 62 and the resistor 61, the circuit being from the left-hand terminal of the field $F^4$, through the cam switch 2, the resistor 62, the resistor $R^2$, cam switch 5, and resistor 61 to the right-hand terminal of the field $F^4$. The armature $A^4$ is connected in a closed circuit with the field windings of all of the machines, the circuit being from the left-hand terminal of the armature $A^4$, through the cam switch 13, series field $F^1$, series field $F^4$, resistor 61, cam switch 5, resistor $R^2$, contactor 21, cam switch 8, series fields $F^2$ and $F^3$ and cam switch 15 to the right-hand terminal of the armature $A^4$. The connections established during braking will readily be understood from an inspection of Fig. 3, although it must be kept in mind that the connections in Fig. 3 are those established at an intermediate position of the controller, one in which the resistor $R^1$ has been short circuited and in which the resistor $R^2$ has been varied to increase the braking current. It will be observed that in this connection the resistor 61, which I term a balancing or compensating resistor, provides a common path for the current in the field of the exciter portion of the dynamo-electric machines, and the path of the current which is delivered to the supply circuit, which flows through the armatures $A^1$, $A^2$ and $A^3$.

When the handle 41 of the master controller is moved to the second operative position, the contactor 33 is energized to close and short circuit a portion of the resistor $R^1$. In the third position the contactor 31 is energized to close and short circuit two more increments of the resistance. In the fourth position the contactor 36 is energized to close and short circuit two more increments of the resistor $R^1$, and in the fifth position the contactor 37 will close and short circuit the final section of the resistor $R^1$. It will be observed that the resistor $R^1$ is short circuited step by step in the same manner as that which occurred during series motoring operation. The armatures $A^1$, $A^2$ and $A^3$ will now be connected directly across the supply circuit in series with the balancing or compensating resistor 61.

The braking current will now be controlled, either increased or decreased, and varied in any desirable manner by the control of the excitation of the dynamo-electric machines. This is accomplished between the fifth and fourteenth positions of the controller. Assume that it is desired to increase the excitation of the machines. This will be done by moving the controller to the sixth position, thereby energizing the contactor 22 to close and short circuit an increment of the resistor $R^2$. When the controller is moved to the seventh position, the winding of contactor 21 is deenergized and the winding of contactor 23 is energized, so that the contactor 21 drops out and contactor 23 closes. This will have the effect of moving to the right the adjustable connection shown in Fig. 3 between the left-hand terminal of the field $F^2$ and the resistor $R^2$. It will be observed that the current flowing through the field $F^4$ of the exciter portion of the dynamo-electric machines is varied responsively to the difference between the voltage drop across the resistor 61 and that portion of the resistor $R^2$ determined by the position of the variable connection with the resistor, and the voltage drop across the remainder of the resistor $R^2$ and the resistor 62. It will also be understood that the variable connection with the resistor $R^2$, referred to above, is provided by means of the contactors 21 to 30 inclusive, and that as the handle 41 of the master controller is moved clockwise step by step the contactors controlling the resistor $R^2$ are successively closed, and as one contactor closes a previously operated contactor opens. This has the effect of shifting the point of connection with the resistor to the right or the left, depending upon the direction in which the handle 41 of the master controller is moved. Generally speaking, a movement of the master controller clockwise will increase the braking effect by increasing the voltage drop across the field $F^4$ of the exciter, and thereby increasing the current in the closed excitation circuit. The resistor 62 will never be short circuited, thereby providing against including the armature $A^4$ and the fields $F^1$, $F^2$ and $F^3$ in a local closed circuit of such a low resistance that an excessive current would flow in this circuit.

It will be seen that during the electric braking, the master controller is moved in the same manner as that in which it was moved during series motoring, and that the resistor $R^2$ is varied in the same increments during braking as during motoring. It will also be seen that the same electromagnetic switches which control the starting resistors during motoring also control these resistors to vary the braking effect. These are particularly important advantages of my invention, and by reason of them my system of regenerative braking has a very great number of the complications eliminated which are ordinarily present in regenerative braking systems heretofore proposed.

The arrangement is such that regulation of the braking current is inherent in the connections. Thus, assume that the potential of the source of supply should suddenly drop, as frequently happens in traction systems. There will be a momentary surge of current through the armatures $A^1$, $A^2$, $A^3$ and the resistor 61. This will cause a greater drop of potential across this resistor 61 and in that manner decrease the voltage drop across the exciter field $F^4$. The excitation of the exciter is thereby reduced as the current flowing through the resistor 61 increases. This will in turn reduce the current flowing through the fields $F^1$, $F^2$ and $F^3$, thereby reducing the generated potential of the dynamo-electric machines and compensating for the variation in the potential of the trolley circuit. It will be understood by those skilled in the art that the effect of reducing the excitation of the dynamo-electric machines is substantially simultaneous with the attempt of the machines to deliver a greater current to the supply circuit than desired. It will also be observed that since only the exciter field $F^4$ of the dynamo-electric machines is shunted by a resistance, the compensating action is particularly rapid since the inductance of the field $F^4$ is small as compared to the total inductance of the closed circuit.

It will also be observed that the direction of current through the fields of the dynamo-electric machines during braking is the same as that during motoring, and that only the excitation current flows through the fields of these machines and the exciter armature $A^4$. That is a distinct advantage for the reason that the exciter portion of the machines can be fully loaded without having to carry any of the regenerated current, and the fields of the regenerating machines likewise carry only the excitation current. That permits both the fields and the armatures of all of the machines to be fully loaded if desired without the braking effect being limited to a low value by reason of the fact that a portion of the dynamo-electric machines is required to carry both the excitation and the regenerated current. It will also be observed that no relays, motor-operated rheostats, or other automatic devices are necessary in the arrangement to give proper braking characteristics, since these proper braking characteristics are inherent in the connections established. It will also be observed that the compensating action against changes in line voltage increases as the field of the exciter weakens and the speed of the dynamo-electric machines increases. This is a very important advantage since the tendency to arc over at their commutators is always greater at weak fields and high speeds in machines which operate as motors part of the time and as generators to retard the load by electric braking the other part of the time.

Figure 5:
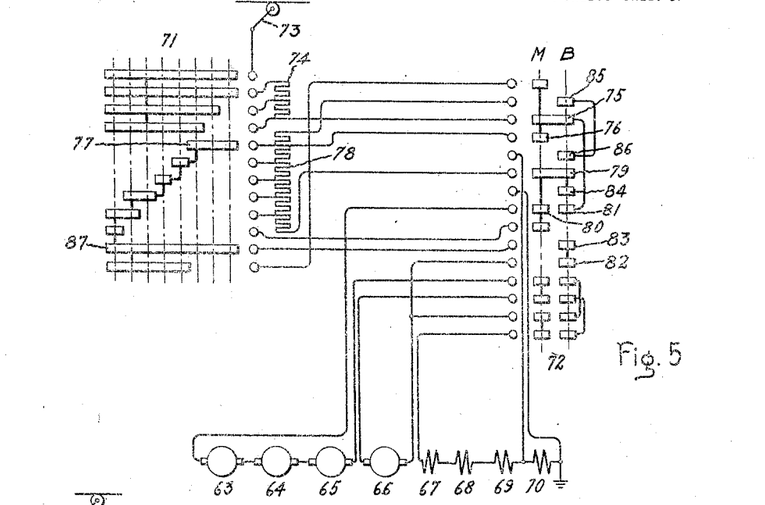
Fig. 5 is a simplified diagram of a control arrangement embodying another form of my invention.
Figure 6:
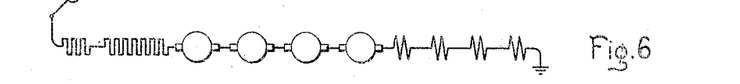
Fig. 6 is a motoring connection established on the first point of the controller of Fig. 5.

In the arrangement of Fig. 5, I have shown a modification of my invention which gives a braking characteristic for the dynamo-electric machines which under certain circumstances may be more desirable than in the arrangement heretofore described. It will be understood that the invention is broadly the same in each case and that the modified arrangement is shown merely to illustrate the adaptability of my invention in meeting certain operating conditions. In this figure I have shown an arrangement which is intended for operation only in one direction, and for series motoring operation only, but that has been done merely for the sake of an easy understanding of the arrangement. It will also be seen that I have provided a drum controller which directly controls the speed of the machines when motoring and the braking current when braking. It is believed that those skilled in the art will readily understand the manner in which this arrangement can be modified for operation in the reverse direction, and the manner in which the scheme can be controlled through what is known in the art as remote control; that is, by means of a master switch which controls electromagnetic switches and contactors which in turn control the circuits of the dynamo-electric machines. Referring to Fig. 5, the dynamo-electric machines having armatures 63, 64, 65 and 66 and corresponding series fields 67, 68, 69 and 70 are adapted to be controlled by means of a drum controller 71 which has associated therewith a selector switch 72, the first position of which establishes motoring connections and the second position of which establishes braking connections. From what has been explained before of my invention, it is believed that an understanding of this modification will be readily had from a description of the operation of the arrangement. Assume that the selector switch 72 has been thrown to the left to the first operative position, at which series motoring connections are established, and the controller 71 is turned to the right to the first operative position. This will connect the dynamo-electric machines in series relation across the supply circuit as shown in Fig. 6, the circuit being from the trolley 73, through the segments of the controller 71, resistor 74, segment 75 of the selector switch, segment 76, through segment 77 of the controller 71, through the greater portion of the resistor 78, segment 79 of the selector switch 72, segment 80 of this switch, through the armatures and fields of the dynamo-electric machines in series to ground. The resistors 74 and 78 will be cut out in a plurality of successive steps of substantially equal resistance values as the controller is moved through its successive operative positions to the right. The motors will thereby be connected directly in series relation across the supply circuit for full motoring operation in the final position of the controller.

Figure 7:
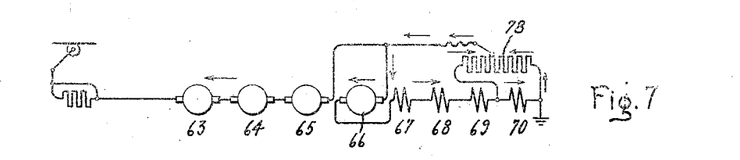
Fig. 7 is a simplified diagram of the connections established in the arrangement of Fig. 5 when the dynamo-electric machines are connected for electric braking.

Assume that it is now desired to cause the dynamo-electric machines to operate as electric braking generators. The controller 71 will first be turned to the left to the off position. The selector switch 72 will be thrown to the left to its second operative position at which connections are established for braking. When the controller 71 is now turned to the right to the first operative position, in the same manner as that during motoring, the dynamo-electric machines are connected to the source of supply so as to operate as electric braking generators and connections will be established as shown in Fig. 7 in which the resistor 78 is connected in a shunt circuit to the series field 70 of the exciter portion of the dynamo-electric machines and the exciter armature 66 is connected in a closed loop with the fields of all of the machines. The connections established in the first position of the controller are as follows: The armatures 63, 64 and 65 are connected in series across the supply circuit in series with a portion of the resistor 78, the circuit being from the trolley 73, through the resistor 74, segment 75 of the selector switch, segment 81 of this switch, armatures 63, 64 and 65, segments 82 and 83 of the selector switch, through the segments of the controller to the segment 77, through the greater portion of the resistor 78 to the segment 79, segment 84 to ground. The shunt circuit around the exciter field 70 is as follows: From ground, the segments 84 and 79, through the entire resistor 78, segment 85, segment 86 to the left-hand terminal of the exciter field 70. The closed circuit in which the exciter and the series fields of the other machines are included may be traced as follows: From the left-hand terminal of the armature 66, through the lower segments of the selector switch, series fields 67, 68, 69 and 70, segment 84 of the selector switch, segment 79 of the selector switch, through the portion of the resistor 78 determined by the position of the controller 71, segments 83 and 82 of the selector switch to the right hand terminal of the armature 66. The current through the exciter armature will therefore be in the reverse direction from the direction in motoring. As the controller is moved to the right through its successive operative positions, the effect of varying the connection between the right-hand terminal of the exciter armature 66 and the resistor 78 is produced. In this figure, in the same manner as in that of Figs. 1, 2 and 3, the excitation of the exciter field 70 is responsive to the difference between the voltage drop across the right-hand portion of the resistor 78 and the voltage drop across the left-hand portion of this resistor. It will be perceived that this arrangement has numerous features in common with the arrangement of Figs. 1, 2 and 3. The regenerative current flows through the right-hand portion of the resistor 78 and through the armatures 65, 64 and 63, but does not flow through either the exciter, armature field or the fields 67, 68 and 69 of the regenerating machines. It will also be observed that only the excitation current flows through the exciter and the fields 67, 68 and 69, but that there is a common path for both the regenerating current and the major portion of the excitation current through the right-hand portion of the resistor 78. Thus, the regenerating current may be nicely controlled by moving the variable connection back and forth across the resistor 78, and the portion of the resistor 78 included in both the regenerating circuit and the excitation circuit provides means whereby inherent compensation for changes in line voltage is secured. It will also be observed that the controller 71 is moved successively through the same operative positions during braking as during motoring operations.

Figure 8:
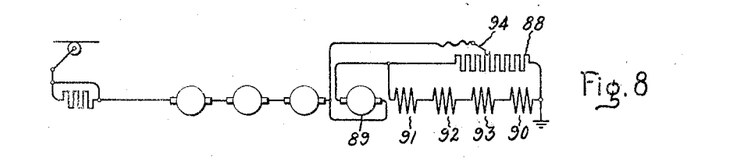
Figs. 8 and 9 are simplified schematic diagrams illustrating in simplified form modifications of my invention.
Figure 9:
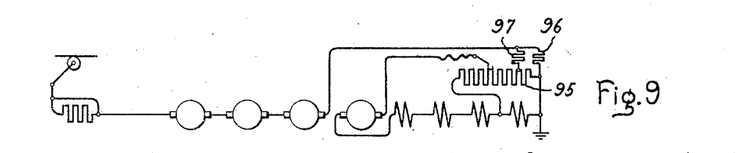

In Fig. 8, I have shown a still further modified form of my invention. It will be understood that this is a very simplified diagram of the connections established during braking. It is considered that from the description of my invention heretofore given that it will be unnecessary to describe the manner in which this arrangement can be controlled by means of either a master controller or a drum controller, or by means of a selector switch or a reversing switch. Those skilled in the art will readily supply such connections from the description of my invention heretofore given. In this arrangement the resistor 88 is shunted around all of the fields of the dynamo-electric machines and the exciter having an armature 89 and field 90 is included in a local circuit with the series fields 91, 92 and 93 of the other machines by means of a variable connection 94 with the resistor 88. This arrangement, while producing braking characteristics which may be desirable under certain conditions, has the disadvantage that the compensating effect due to variations in the line potential is not so rapid as in the arrangements heretofore described, because the resistor 88 is shunted around the series fields of all of the machines. The inductive effect of all of these fields connected in series will materially retard the compensating effect, but the final result will be substantially the same as that of the arrangement heretofore described. In Fig. 9, I have shown a still further modification of my invention which is substantially the same as that of Figs. 1, 2 and 3, with the exception that the resistor 95 which corresponds with the resistor 61 of Figs. 1, 2 and 3 is shunted by two resistors 96 and 97. These resistors 96 and 97 permit variations in the braking characteristics for the dynamo-electric machines slightly different from those obtained by the arrangements of Figs. 1, 2 and 3. Otherwise the operation of the scheme is the same as Figs. 1, 2 and 3.

Figure 10:
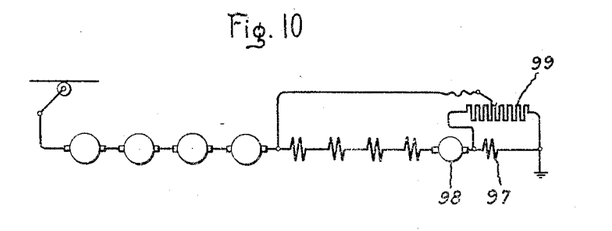
Figs. 10, 11 and 12 are simplified schematic diagrams illustrating embodiments of my invention in control arrangements for dynamo-electric machines for electric braking in which a separate dynamo-electric machine is provided for furnishing the excitation of the fields of the main dynamo-electric machines during braking.
Figure 11:
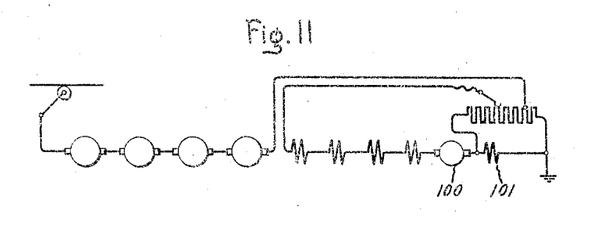
Figure 12:
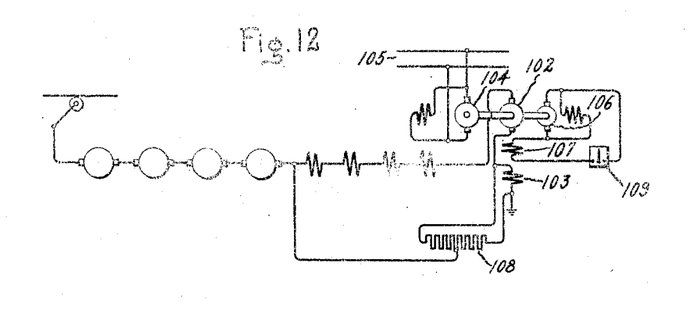

Under certain circumstances sufficient braking effect may not be obtained by the use of one of the driving dynamo-electric machines as a series exciter for the fields of the remainder of the machines, and to provide for such conditions I have shown in simplified form the arrangements of Figs. 10, 11 and 12.

Fig. 10 is substantially the same as Fig. 7, with the exception that a separate dynamo-electric machine having an armature 98 and series field 97 is provided for furnishing the excitation for the machines during braking. The series field 97 of this machine is shunted by means of a resistor 99 which is part of the starting resistance during motoring and this separate exciter is connected in a closed circuit with the fields of the machines in the same manner as the exciter of Fig. 7 is connected in the closed circuit with the fields of the armature of the machines. This exciter will be driven in any suitable manner, preferably by the load, although it may be separately driven if desired. This exciter may also be used as a driving motor in case it is desirable to do so.

Fig. 11 is a simplified diagram of an arrangement similar to the braking connections of Fig. 3, with the exception that a separate exciter having an armature 100 and series field 101 is provided for supplying the excitation of the dynamo-electric machines. From the description of my invention, which is heretofore given, it is believed that the operation of this arrangement will be readily understood without further description.

In Fig. 12, I have shown an arrangement similar to that of Fig. 10, with the exception that the exciter having an armature 102 and a series field 103 forms a part of a motor generator set comprising a shunt-wound motor 104 which receives energy from a suitable source of potential such as the supply circuit 105. Excitation for the exciter of this arrangement is also supplied by means of a shunt-wound auxiliary exciter 106 driven by the motor 104, and on the same shaft as the armature 102. This small auxiliary exciter 106 will supply separate excitation for a field 107 on the main exciter for the fields of the regenerating dynamo-electric machines. A resistor 108, which will be used for acceleration purposes during motoring operation, is shunted around the series field 103 of the exciter 102, and the exciter armature 102 is connected in a closed circuit which includes the series fields of the main dynamo-electric machines, a portion of the resistor 108 and the field 103 of the exciter. The braking effect is varied by varying the excitation of the field 107 through the operation of a rheostat 109 in this field circuit. Otherwise the scheme functions substantially the same as the arrangement of Fig. 10.

What I claim as new and desire to secure by Letters Patent of the United States, is,—

1. In a system of control for electric braking, a resistor, a plurality of dynamo-electric machines, a portion of the armatures of which is connected in series with the resistor to form a braking circuit, and another portion of the armatures of which operates as an exciter connected with the field windings of all of the machines in a shunt circuit to the resistor.

2. In a system of regenerative braking, the combination with a source of supply, of a plurality of dynamo-electric machines operatively connected to the source of supply, a resistor, a portion of the armatures of said machines connected in series with the resistor across the supply circuit, and another portion of the armatures of which operates as an exciter connected with the field windings of all the machines in a local shunt circuit to the resistor.

3. In a system of control for electric braking, a plurality of dynamo-electric machines, a resistor, a portion of the armatures of said machines connected in series with the resistor to form a braking circuit, another portion of the armatures operating as an exciter connected with the field windings of all of the machines in a local shunt circuit to the resistor, and a connection establishing a shunt around the field windings of the exciter portion of the machines.

4. In a system of control for electric braking, a plurality of dynamo-electric machines, or resistor, a portion of the armatures of said machines connected in series with the resistor to form a braking circuit, another portion of the armatures of which operates as an exciter connected with the field windings of all of the machines in a local shunt circuit to the resistor, and means for shunting a portion of the current generated by the exciter from the field windings of the exciter.

5. In a system of control for electric braking, a plurality of dynamo-electric machines, a resistor, a portion of the armatures of said machines connected in series with the resistor to form a braking circuit, another portion of the armatures of which operates as an exciter connected with the field windings of all of the machines in a local shunt circuit to the resistor, and a connection establishing a non-inductive shunt circuit of variable resistance around the field windings of the exciter portion of the machines.

6. In a system of control for electric braking, a plurality of dynamo-electric machines, a resistor, a portion of the armatures of said machines connected in series with the resistor to form a braking circuit, another portion of the armatures of which operates as an exciter connected with the field windings of all of the machines in a local shunt circuit to the resistor, and a variable resistor in the said local circuit, the said resistors being connected in series in a shunt circuit to the field windings of the exciter portion of the machines.

7. In a system of control for electric braking, a plurality of dynamo-electric machines, a portion of the armatures of said machines connected in a closed circuit with the field windings of all of said machines to excite said field windings, and the remainder of the armatures connected to the closed circuit so that the braking current has a path through a portion of the closed circuit, the connections being such that the braking current does not flow through the said exciter portion of the armatures or the fields of any of the machines.

8. In a system of control for electric braking, a plurality of dynamo-electric machines, a portion of the armatures of said machines connected in a closed circuit with the field windings of all of said machines to excite said field windings, and the remainder of the armatures connected to a point in the closed circuit so that the braking current flows through a portion of the closed circuit without flowing through the exciter portion of the armatures or the field windings of any of the machines.

9. In a system of control for electric braking, a plurality of dynamo-electric machines, a portion of which is connected in a closed circuit with the field windings of the other machines to operate as an exciter for the machines, and the remainder of the armatures being connected to a point in the closed circuit, the connections being such that the excitation current of the exciter portion of the machines and the braking current have a common path through a portion of the closed circuit, and only the excitation current flows through the said exciter portion of the machines and the field windings of the remainder of the machines.

10. In a system of control for electric braking, a resistor, a plurality of dynamo-electric machines, a portion of which operates as an exciter for the field windings of said machines and is connected in a closed circuit with the field windings of all of the machines and the resistor, the remainder of the armatures being connected to the resistor and the connections being such that the braking current flows through said remainder of the armatures and the resistor and only the excitation current flows through the said exciter portion of the machines and the field windings of the remainder of the machines.

11. In a system of control for electric braking, a resistor, a plurality of dynamo-electric machines, a portion of which operates as an exciter for the field windings of said machines and is connected in a closed circuit with the field windings of all of the machines and the resistor, the remainder of the armatures being connected to the closed circuit so that the braking current flows through only that part of the closed circuit which includes the resistor.

12. In a system of control for electric braking, a resistor, a plurality of dynamo-electric machines, a portion of which operates as an exciter for the field windings of said machines and is connected in a closed circuit with the field windings of all the machines and the resistor, and connections whereby the excitation of said machines is varied responsively to the value of the braking current and only the excitation current flows through said exciter portion of the machines and the field windings of the remainder of the machines.

13. In a system of control for electric braking, a plurality of dynamo-electric machines, a portion of which is connected to operate as an exciter for the field windings of the machines, a resistor shunting the field windings of the exciter portion of the machines, and a connection from the remainder of the armatures of said machines to the resistor whereby the braking current flows through the resistor without flowing through the exciter portion of said machines or the field windings of the said remainder of the machines.

14. In a system of control for electric braking, a plurality of dynamo-electric machines, a resistor shunting the field windings of a portion of the machines, the said portion connected in a closed circuit with the field windings of said machines to operate as an exciter for the same, a direct connection from the remainder of the armatures of said machines to the resistor, and another direct connection to the resistor completing the circuit of said remainder of the armatures through the resistor.

15. In a system of control for electric braking, a plurality of dynamo-electric machines, a portion of which operates as an exciter for the machines, a resistor shunting the field windings of said exciter portion of the machines, a variable connection to the resistor including the exciter armature, the fields of the remainder of the machines and a variable part of the resistor in a local circuit, and connections whereby the current through the remainder of the armatures and the excitation current for the said exciter portion of the machines have a common path through a portion of the said resistor.

16. In a system of control for electric braking, a plurality of dynamo-electric machines, a variable resistor shunting the field windings of a portion of the machines, the said portion of the machines operating as an exciter for said machines and connected in a closed circuit with the field windings of said machines by means of a variable connection with said resistor, a direct connection from the remainder of the armatures of said machines to the resistor, and another direct connection to the resistor completing the circuit of said remainder of the armatures through the resistor.

17. In a system of control for electric braking, a plurality of dynamo-electric machines, a variable resistor shunting the field windings of a portion of the machines, the said portion of the machines operating as an exciter for said machines and connected in a closed circuit with the field windings of said machines, by means of a variable connection with said resistor, a direct connection from the remainder of the armatures of said machines to the resistor, and another direct connection to the resistor completing the circuit of said remainder of the armatures through the resistor, the connections being such that a portion of the resistor completes the only common path for the current in the field windings of the exciter portion of the machines and the said circuit through the said remainder of the armatures.

18. In a system of control for electric braking, a plurality of series wound dynamo-electric machines, a separate motor-driven exciter having a series field and an armature connected in a closed circuit with the field windings of said machines, a resistor shunting the exciter series field, connections establishing a path for the braking current through a portion of said resistor, and a separately excited field for the exciter for varying the braking effect.

19. The combination in a system of control, of a plurality of dynamo-electric machines adapted to operate as motors to drive the load or as generators to brake the load, a resistance for varying the speed of the machines when operating as motors and the excitation of said machines when they operate as generators, and means whereby the resistance is varied in the same successive increments during braking and motoring operations.

20. The combination in a system of control, of a plurality of dynamo-electric machines adapted to operate as motors to drive a load or as generators to brake the load, variable resistance for varying the speed of the machines when operating as motors and the excitation of the machines when they operate as generators, a controller for said resistance having a plurality of successive operative positions, and connections whereby the said controller is moved through the same successive operative positions during braking and motoring operations.

21. The combination in a system of control, of a plurality of dynamo-electric machines adapted to operate as motors to drive a load or as generators to brake the load, a resistance for varying the speed of the machines when operating as motors and the excitation of the machines when they operate as generators, a controller for said resistance having a plurality of successive operative positions, and connections whereby the controller is moved through the same successive operative position and the said resistance is varied in the same successive increments during braking and motoring operations.

22. The combination in a system of control, of a plurality of dynamo-electric machines adapted to operate as motors to drive a load or as generators to brake the load, a resistor for varying the speed of the machines when operating as motors and the excitation of the machines when they operate as generators, a controller having a plurality of successive operative positions for controlling the said resistor, a selector switch co-operating with the master controller for establishing motoring or braking connections for the said machines, and connections whereby the controller is moved through the same successive operative positions during braking and motoring operations.

23. The combination in a system of control, of a plurality of dynamo-electric machines adapted to operate as motors to drive a load or as generators to brake the load, a controller having means whereby the machines are connected in series or in multiple relation for motoring operation, or a portion of said machines is connected in a closed circuit with the fields of the machines for braking operation, and connections whereby the controller is moved through the same successive operative positions during braking as during motoring operation with the motors connected in series.

24. The combination in a system of control, of a plurality of dynamo-electric machines adapted to operate as motors to drive a load or as generators to brake the load, a controller having a plurality of successive operative positions for varying the speed of the machines during motoring and the braking current during braking, and means whereby the motors are connected in series or multiple relation for motoring operation, or one of the machines is connected in a local closed circuit with the fields of all the machines for braking, and the controller is moved through the same successive operative positions during braking and series motoring operations.

25. The combination in a system of control, of a supply circuit, a plurality of dynamo-electric machines adapted to operate as motors to drive a load or as generators to brake the load by returning energy to the supply circuit, a variable resistor for varying the speed of the machines when operating as motors and the braking current when they operate as generators, switch mechanism for establishing motoring connections, or for shunting the field windings of a portion of the machines with the resistor, connecting this portion of the armatures in a local closed circuit with the field windings of the machines, and connecting the remainder of the armatures in series with a portion of the resistor across the supply circuit for braking operation, a controller having a plurality of successive operative positions for varying the said resistance, and connections whereby the controller is moved through the same successive operative positions during braking and motoring operations.

26. The combination in a system of control, of a plurality of dynamo-electric machines adapted to operate as motors to drive a load or as generators to brake the load, a resistor for varying the speed of said machines when operating as motors and the excitation of the machines when they operate as generators, switch mechanism for establishing motoring or braking connections for the said machines, a plurality of electromagnetic switches for controlling the resistor, a master controller having a plurality of successive operative positions for controlling the said electromagnetic switches, and connections whereby the controller is moved through the same successive operative positions to control the electromagnetic resistance switches during braking and motoring operations.

In witness whereof, I have hereunto set my hand this 18th day of February, 1920.

PETER W. FORSBERG.

Certificate of Correction.

It is hereby certified that in Letters Patent No. 1,421,931, granted July 4, 1922, upon the application of Peter W. Forsberg, of Schenectady, New York, for an improvement in "Electric Braking," errors appear in the printed specification requiring correction as follows: Page 8, line 100, claim 4, for the word "or" read *a;* page 10, line 78, claim 21, for the word "position" read *positions;* and that the said Letters Patent should be read with these corrections therein that the same may conform to the record of the case in the Patent Office.

Signed and sealed this 26th day of September, A. D., 1922.

[SEAL.]

WM. A. KINNAN,

*Acting Commissioner of Patents.*